Figure 1:
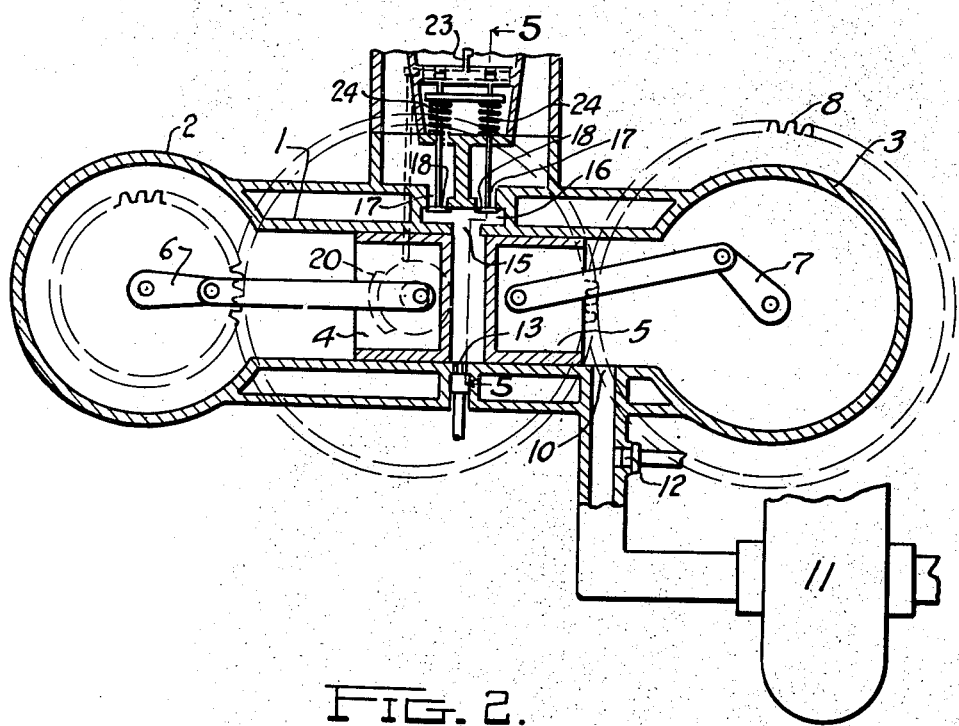

June 21, 1949.     M. MALLORY     2,473,760
INTERNAL-COMBUSTION ENGINE

Filed May 7, 1947     2 Sheets-Sheet 1

INVENTOR.
Marion Mallory
BY Owen & Owen,
ATTORNEYS

June 21, 1949.  M. MALLORY  2,473,760
INTERNAL-COMBUSTION ENGINE
Filed May 7, 1947  2 Sheets-Sheet 2
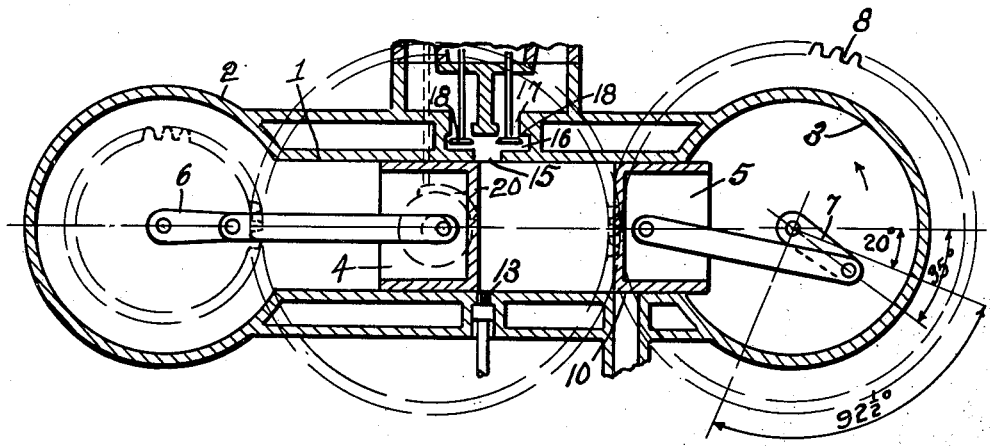
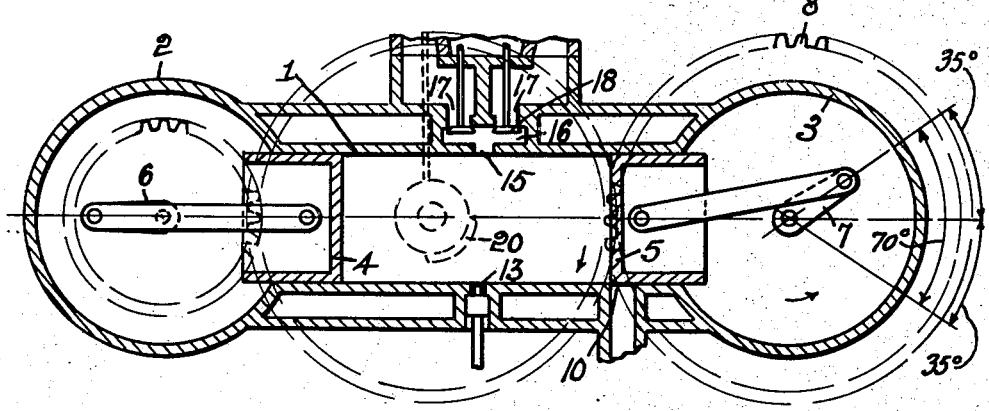
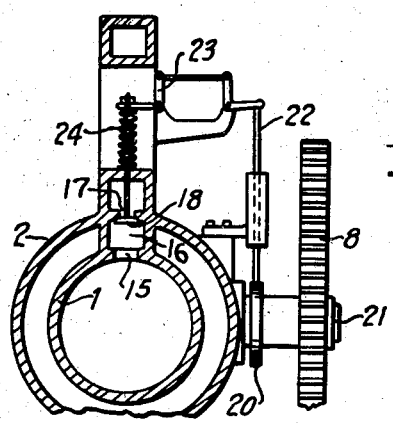
INVENTOR.
Marion Mallory
BY Owen & Owen,
ATTORNEYS Patented June 21, 1949

2,473,760

UNITED STATES PATENT OFFICE 2,473,760

INTERNAL-COMBUSTION ENGINE

Marion Mallory, Detroit, Mich., assignor to The Mallory Research Company, Detroit, Mich., a corporation of Michigan Application May 7, 1947, Serial No. 746,539

20 Claims. (Cl. 123—51)

This invention relates to internal combustion engines, and particularly to improvements on the general type of engine disclosed in my Reissue Patent No. 22,863, dated April 8, 1947.

An object of the invention is to increase the efficiency of a two-cycle engine of this type by reversing the positions of the customary intake and exhaust ports whereby the former is located at or near the center of the cylinder and is controlled by means other than the piston or pistons and the latter is controlled by the slow moving piston and uncovered thereby at the outer end portion of its movement. With this arrangement of the exhaust and intake ports and the cooperative action of the two pistons, with one moving twice as fast as the other, the intake time is not only greatly increased but the suction created in the cylinder by the outwardly moving pistons during a portion of such period accomplishes about 50% of the charge, thus effecting full charging of a cylinder with the use of a materially lower charging pressure than is possible with present time two-cycle engines.

Another advantage of the invention is that in addition to the pistons accomplishing approximately 50% of the charging, they also accomplish approximately the same amount of exhausting so that not only lower charging pressures for exhausting and scavenging may be used than at present, but the exhaust valve may have later opening. In the conventional type of two-cycle engines, the exhaust valve must open early to permit the exhaust pressures to die down before the intake port is opened, for if exhaust pressures are present in the cylinder at the time the intake port opens, such pressures will oppose the charging pressures, and high charging pressures would, of course, be necessary to overcome the high exhaust pressures. It would also be difficult to get a full charge into the cylinder. In my present engine, not only does the exhaust port open well in advance of the intake opening, but the faster traveling piston actually moves approximately 50% of the exhaust gases out of the cylinder before the intake opens. This makes possible utilizing the long dwell of the expansion pressures. In other words, it is not necessary to release the excessive expansion pressures to the atmosphere long before the power piston has reached the end of its leverage over the crank, as is the case with the conventional two-cycle engine, in order to give time for the exhaust pressures to escape and the cyinder cool down before the intake charge is admitted.

In this invention, the pressure charge assisting action of the pistons and cylinders is an important feature, as one of the principal difficulties in the use and operation of two-cycle engines has been the time given for exhausting and intaking which, due to its shortness, has made it necessary to use high charging pressures so that charges of sufficient volume can be introduced during the charging period. The use of high pressure charges is objectionable, particularly where such charges are generated by the engine itself, due to the horsepower necessary to run the blower or other charge creating means.

Further objects and advantages of the invention will be apparent from the following detailed description, and from the accompanying drawings, in which—

Figure 2:
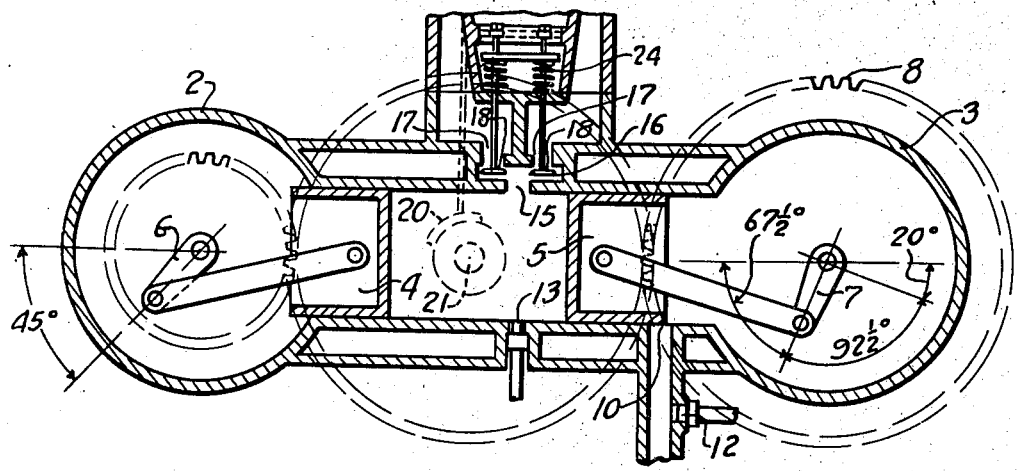

Fig. 1 is a section through an engine, showing the position of the ports at substantially the completion of the compression stroke, and at the beginning of the power stroke, with both the intake and exhaust ports closed; Fig. 2 is a similar section with parts omitted, showing the position of the movable parts at approximately the end of the power stroke of the fast moving piston, or at approximately the beginning of the opening of the exhaust, with the charge intake port still closed by the slow moving piston; Fig. 3 is a view similar to Fig. 2, showing the position of the parts at the end of the first instroke of the fast moving piston in a cycle, with the exhaust valves still open and the slow moving piston at the point where uncovering of the intake port begins; Fig. 4 is a similar view showing the relative position of the parts when the slow moving piston has just moved to intake port closing position on its compression stroke, and with the exhaust valves closed, and Fig. 5 is a fragmentary cross-section on the line 5—5 in Fig. 1.

In the drawings, I designates an engine cylinder the ends of which open into respective crank cases 2 and 3. Pistons 4 and 5 operate in opposite end portions of the cylinder and are connected to the crank arms 6 and 7 of respective crankshafts, the former in the case 2 and the latter in the case 3. The crankshafts are connected in any suitable manner, as by a gear train 8, to have a turning ratio of two-to-one, so that the crank 6 makes two complete revolutions to one of the crank 7. Any driving connection between the crankshafts may be termed a gear train. The relation of the connection of the pistons with their cranks is preferably such that when the wrist-pin of crank 6 is in its inner dead center position, the wrist-pin of crank 7 is approximately 45° short of its inner dead center position, as shown in Fig. 1. This is approximately the relative position of the pistons when firing occurs. The rotation of the two crankshafts is preferably, but not necessarily, in counterclockwise direction.

The cylinder 1 has an air charging port 10 in its side wall near one end thereof in position to be uncovered by the slow moving piston 5 during the outer end portion of its travel. In the present instance, the size and location of the port is such that uncovering occurs during approximately a 70° movement of the associated crank 7 across outer dead center, as indicated in Figs. 3 and 4. The port 10 is connected with the blower 11 or other suitable low pressure charging means that in turn may be connected to and operated by the engine in any suitable or well-known manner. If electric ignition is to be used, liquid fuel may be injected into the air charge passage and through the port 10, in any suitable manner, as by an injector nozzle 12 having communication with a source of fuel supply and being controlled in a manner well understood in the art. A spark plug for electrical ignition may be located in the cylinder at 13, or if it is desired to operate the engine on the Diesel principle, a high pressure injector nozzle may be located at this point.

The exhaust is through a port 15 in the cylinder wall substantially centrally of its ends. In the present instance, this port opens into a chamber 16 having two exhaust ports 17 therefrom each controlled by a respective valve 18. It is preferable to provide two exhaust valves, as this permits the use of smaller valves, thus enabling a more rapid dissipation of heat therefrom to the water jacket, and a cooler running, than in the case of a single larger valve. One valve, however, may be used if desired.

The means illustrated for operating the two exhaust valves 18 at a proper point in each cycle of operation comprises a cam 20 on the shaft 21 (Fig. 5) of the center gear of the train 8, which gear turns at the same speed as the crankshaft 7. This cam operates a push-rod 22 that is connected to and in turn operates a rocker 23 which acts on the outer ends of the valve stems to open the valves against the closing action of the valve springs 24.

The valve (not shown) for the fuel injector nozzle 12 may be controlled in any suitable manner, as well understood in the art, so that the fuel charge enters the cylinder with the inrushing air charge at the proper time in a cycle. The fuel injection period is during the time the intake port 10 is uncovered by the piston and varies in time and quantity in accordance with the idling and load requirements of the engine.

In the operation of the engine, ignition takes place preferably when the pistons are in approximately the position shown in Fig. 1, with the fast crank 6 at inner dead center and the slow crank 7 at approximately 45° short of such position. If the engine is operated on the Diesel principle the fuel injection nozzle at 13 would discharge at approximately this time, and if electrical ignition is used the spark should occur at approximately the same time. As the time of injection and the time of the spark can be determined only by performance, both such times will have to be determined when the engine is in operation. The explosion will drive the two pistons 4 and 5 to approximately the position shown in Fig. 2, with the slow crank 7 approximately 67½° past inner dead center and the fast crank 6 approximately 45° past its outer dead center. At approximately this point in the operation the exhaust valves 18 begin to open and, as piston 4 travels twice as fast as piston 5, it will move part of the exhaust gases out through the open exhaust ports. When the pistons reach the positions shown in Fig. 3, piston 4, due to its inward movement, will have moved part of the exhaust gases from the cylinder and the piston 5 will be at a point where uncovering of the intake port 10 begins. The uncovering of the intake port permits a charge of air to enter the cylinder and act first as a scavenging agent to expel the remainder of the exhaust gases from the cylinder and then to supply air for compression and to support combustion. The exhaust port is preferably closed at approximately 20° before the slow crank 7 reaches its outer dead center and approximately 10° after the uncovering of the intake port 10 commences, as indicated in Fig. 3. During the period that a charge is taking place the fast piston will be moving outward and creating a suction in the cylinder to assist the blower or charger filling the cylinder. The intake port 10 closes when the fast piston 4 is in approximately outer dead center position and the slow piston has closed the intake port and is approximately 35° past its outer dead center position, as indicated in Fig. 4. This is the beginning of the compression stroke which ends with the pistons in the firing positions shown in Fig. 1.

With this manner of operation, the times of exhausting and intaking have been greatly increased over other engines of the two-cycle type and at the same time the engine cylinders themselves, due to the action of the pistons therein, effect about 50% of the charging as well as the exhausting operations. This augmenting, by the piston action, of the charging and exhausting of the cylinders enables low pressure charging to be used where high pressures were before necessary, thus considerably reducing the horsepower for operating the blower or charger and permitting it to be used for other work. Furthermore, the necessity of earlier opening of the exhaust to give time for the exhaust pressures to drop before the intake port opens, so that the exhaust pressures would not oppose the intake pressures, is obviated.

Another advantage of this engine is that at the beginning of the firing stroke, which will, of course, be slightly in advance of the maximum compression, as is the case with other engines, piston 5 will move toward piston 4 and piston 4 will rapidly move away from inner dead center position getting into turning power, and even though piston 4 loses its leverage over crank 6, as it moves toward outer dead center, piston 5 will then be gaining leverage over its crank 7, thus giving the effect of a very long firing stroke. It is thus apparent that with the present engine the firing strokes as well as the intake and exhaust strokes, considering degrees of crank movements, are increased to the material advantage of efficient and economical operation.

I wish it understood that my invention is not limited to any specific construction, arrangement or form of the parts, or opening and closing of the valves and port 10, as it is capable of numerous modifications and changes without departing from the spirit of the claims.

Having thus described my invention, what I claim as new and desire to secure by United States Letters Patent is:

1. In an internal combustion engine having a cylinder in which two opposing pistons operate and between which combustion occurs, said pistons being connected at opposite ends of the cylinder to separate crankshafts geared together with a two-to-one ratio and to start a cycle with the crank of the fast piston in substantially inner dead center position and the other in lagging relation, means for supplying air charges to the cylinder including an intake port controlled by the slow piston and positioned to be uncovered thereby during a predetermined arc of movement across outer dead center of the crank of said piston, said cylinder having an exhaust port adjacent to its center between the pistons, means operable to open the exhaust port during a considerable portion of the outstroke of the slow piston, and means to inject a fuel charge into the cycle before compression of a charge by opposed inward movements of the pistons.

2. An arrangement as called for in claim 1, wherein the uncovering of the intake port occurs during substantially a 70° movement of the slow piston crank.

3. An arrangement as called for in claim 2, wherein said 70° movement starts approximately 35° short of outer dead center.

4. An arrangement as called for in claim 1, wherein the exhaust port opens before the slow piston crank has moved 90° from inner dead center position and closes shortly before it reaches outer dead center position.

5. An arrangement as called for in claim 1, wherein the exhaust port is opened for approximately a 93° movement of the slow piston crank, starting at approximately 67° past inner dead center.

6. In an internal combustion engine having a cylinder with two opposing pistons operating therein and between which combustion occurs, crankshafts at opposite ends of the cylinder geared together with a two-to-one ratio and connected to respective pistons whereby at the start of a cycle the fast piston is in inner dead center position and the other piston has a slight lag thereover, means for supplying air charges to the cylinder including an intake port controlled by the slow piston and positioned to be uncovered thereby at the outer end of its stroke, means for injecting fuel charges into said means for discharge with the air charges into the cylinder, and means for the exhaust of gases from the cylinder including an exhaust port in a side of the cylinder substantially central of its ends and a control for said means which opens the port for exhaust during a predetermined portion of each outstroke of the slow piston.

7. In an internal combustion engine having a cylinder with two opposing pistons operating therein and between which combustion occurs, crankshafts at opposite ends of the cylinder geared together with a two-to-one ratio and connected to respective pistons whereby at the start of a cycle the fast piston is in inner dead center position and the other piston has a slight lag thereover, means for supplying air charges to the cylinder including an intake port controlled by the slow piston and positioned to be uncovered thereby at the outer end of its stroke, means for injecting fuel directly into the cylinder during compression, and controlled means for the exhaust of gases from the cylinder including an exhaust port in the side of the cylinder substantially central of its ends, and a control for said means which opens the port for exhaust during a predetermined portion of each outstroke of the slow piston.

8. In an internal combustion engine having a cylinder with two opposing pistons operating therein and between which combustion occurs, crankshafts at opposite ends of the cylinder geared together with a two-to-one ratio and connected to respective pistons whereby at the start of a cycle both pistons are at the inner end portions of their strokes, valve controlled means for exhausting gases from the cylinder substantially at its center and operable to open for exhausting during a predetermined portion of the outstroke of the slow moving piston, means uncovered by the slow piston during the outer portion of its movement for admitting an air charge to the cylinder, and means for injecting fuel into the cylinder.

9. An arrangement as called for in claim 8, wherein the crank of the slow piston has approximately a 45° lag with respect to the other.

10. An arrangement as called for in claim 8, wherein the exhaust means is opened during a substantial one-quarter turn of the slow piston crank which ends before reaching outer dead center position.

11. An arrangement as called for in claim 8, wherein the exhaust means is opened during substantially a quarter turn of the slow piston crank which ends before reaching outer dead center position and after an uncovering of the air charge means.

12. An arrangement as called for in claim 8, wherein the fuel is injected directly into the cylinder.

13. An arrangement as called for in claim 8, wherein the fuel is injected into the cylinder through the air charge means together with the air charges.

14. An arrangement as called for in claim 8, wherein the exhaust means includes a plurality of exhaust ports each with a valve therefor.

15. An arrangement as called for in claim 8, wherein the exhaust valve is open during a major portion of an instroke of the fast piston and in overlapping relation to the opening of the intake port.

16. In an internal combustion engine having a cylinder with two opposing pistons operating therein and between which combustion occurs, crankshafts at opposite ends of the cylinder geared together with a two-to-one ratio and connected to respective pistons whereby at the start of a cycle both pistons are at the inner end portions of their strokes, means having a valve controlled port at the central portion of the cylinder in its side operable to exhaust gases from the cylinder during a predetermined portion of the out-stroke of the slow piston, and charge injecting means having an intake port in a side of the cylinder controlled by the slow piston and positioned to be uncovered thereby during a predetermined portion of its outer end movement.

17. In an internal combustion engine having a cylinder with two opposing pistons operating therein and between which combustion occurs, crankshafts at opposite ends of the cylinder geared together with a two-to-one ratio and connected to respective pistons whereby at the start of a cycle both pistons are substantially at the inner ends of their strokes, valve controlled means for exhausting gases from the cylinder near its center, and means for introducing air charges under pressure into the cylinder near an end thereof, said last means including an intake port that is uncovered by the slow piston during a predetermined portion of its outer end movement, and means for injecting fuel charges into said chamber during a predetermined portion of the piston movement, the second outstroke of the fast piston in each cycle taking place during an uncovering of the intake port to create a suction in said chamber which augments the air charging pressure.

18. An arrangement as called for in claim 17, wherein the last portion of the exhaust period occurs during the initial portion of the air charge intake period.

19. An arrangement as called for in claim 17, wherein the power stroke of the fast piston begins before the slow piston reaches inner dead center position and continues for more than 55° of the slow crank movement thereafter, and the exhaust commences short of 90° from outer dead center of the slow piston crank and continues to near such position.

20. An arrangement as called for in claim 17, wherein uncovering of the intake port commences approximately 35° before outer dead center of the slow piston crank and continues approximately 35° past such position.

MARION MALLORY.

REFERENCES CITED

The following references are of record in the file of this patent:

UNITED STATES PATENTS

| Number | Name | Date |
| --- | --- | --- |
| 670,966 | Pender | Apr. 2, 1901 |
| 1,339,187 | Tite et al. | May 4, 1920 |

FOREIGN PATENTS

| Number | Country | Date |
| --- | --- | --- |
| 849,614 | France | 1939 |
| 858,038 | France | 1940 |